(12) United States Patent
Li et al.

(10) Patent No.: US 12,082,737 B2
(45) Date of Patent: Sep. 10, 2024

(54) BEVERAGE BREWING MACHINE

(71) Applicant: TOP ELECTRIC APPLIANCES INDUSTRIAL LIMITED, Guangzhou (CN)

(72) Inventors: Weizhong Li, Guangzhou (CN); Yewu Zhong, Guangzhou (CN)

(73) Assignee: TOP ELECTRIC APPLIANCE INDUSTRIAL LIMITED, Guangzhou (CN)

( * ) Notice: Subject to any disclaimer, the term of this patent is extended or adjusted under 35 U.S.C. 154(b) by 458 days.

(21) Appl. No.: 17/289,954

(22) PCT Filed: Aug. 21, 2019

(86) PCT No.: PCT/CN2019/101774
§ 371 (c)(1),
(2) Date: Apr. 29, 2021

(87) PCT Pub. No.: WO2020/215541
PCT Pub. Date: Oct. 29, 2020

(65) Prior Publication Data
US 2022/0095826 A1     Mar. 31, 2022

(30) Foreign Application Priority Data

Apr. 25, 2019  (CN) .......................... 201920575578.8
Apr. 25, 2019  (CN) .......................... 201920575601.3
(Continued)

(51) Int. Cl.
*A47J 31/053*     (2006.01)
*A47J 31/06*      (2006.01)
(Continued)

(52) U.S. Cl.
CPC ......... *A47J 31/053* (2013.01); *A47J 31/0615* (2013.01); *A47J 31/4457* (2013.01); *A47J 31/46* (2013.01)

(58) Field of Classification Search
None
See application file for complete search history.

(56) References Cited

FOREIGN PATENT DOCUMENTS

| CN | 203168872 U | 9/2013 |
|----|-------------|--------|
| CN | 203220254 U | 10/2013 |

(Continued)

OTHER PUBLICATIONS

"International Search Report & Written Opinion for PCT/CN2019/101774 dated Feb. 1, 2020".

*Primary Examiner* — John J Norton
(74) *Attorney, Agent, or Firm* — Billion & Armitage

(57) ABSTRACT

Disclosed is a beverage brewing machine, including a kettle body, where the kettle body includes a container; the container is internally provided with a water feeding device; the water feeding device includes a flow guide cover, a stirrer, and a driving device for driving the stirrer to rotate; the flow guide cover is provided with a water inlet and an outlet; the stirrer is located in the flow guide cover and positioned at the bottom of the container; a brewing device is disposed above the flow guide cover; the brewing device is provided with a flow guide cavity and an accommodating cavity; the accommodating cavity is communicated with the flow guide cavity, and is provided with a filtering hole; and the driving device is located below the container.

11 Claims, 16 Drawing Sheets

(30) Foreign Application Priority Data

| Apr. 25, 2019 | (CN) | 201920575604.7 |
| Apr. 25, 2019 | (CN) | 201920575885.6 |
| May 8, 2019 | (CN) | 201920647940.8 |
| May 28, 2019 | (CN) | 201920776190.4 |

(51) Int. Cl.
    *A47J 31/44*     (2006.01)
    *A47J 31/46*     (2006.01)

(56) References Cited

FOREIGN PATENT DOCUMENTS

| CN | 103462498 | A |  | 12/2013 |  |
| CN | 103784016 | A |  | 5/2014 |  |
| CN | 203777334 | U |  | 8/2014 |  |
| CN | 204600200 | U |  | 9/2015 |  |
| CN | 106108653 | A |  | 11/2016 |  |
| CN | 106798496 | A | * | 6/2017 | ............ A47J 31/00 |
| CN | 110507189 | A | * | 11/2019 |  |

* cited by examiner

BEVERAGE BREWING MACHINE

This application is a national stage filing under 35 U.S.C. § 371 of international application number PCT/CN2019/101774, filed August, 21 2019, which claims priority to Chinese patent application No. 201920575578.8, filed April, 25 2019, Chinese patent application No. 201920575601.3, filed April, 25 2019, Chinese patent application No. 201920575604.7, filed April, 25 2019, Chinese patent application No. 201920575885.6, filed April, 25 2019, Chinese patent application No. 201920647940.8, filed May, 08 2019, and Chinese patent application No. 201920776190.4, filed May, 28 2019. The contents of these applications are incorporated herein by reference in their entirety.

TECHNICAL FIELD

The present disclosure is used in the field of beverage brewing, and in particularly, relates to a beverage brewing machine.

BACKGROUND

At present, commercially available tea-making machines mainly use tea basket raising and lowering or pipeline pumping water for brewing. The structure of a tea basket raising and lowering mechanism is complicated and the brewing is uneven. In addition, the pumped water is used for brewing, and a guide tube is fixedly disposed in a kettle. Tea scale formed by long-term use or coffee liquid will block the pipeline and it is not easy to clean the tea scale or the coffee liquid.

SUMMARY

An objective of the present disclosure is to solve at least one of the technical problems existing in the prior art, and to provide a beverage brewing machine which can uniformly brew a beverage without blocking a pipeline and is convenient to clean.

The technical solution adopted by the present disclosure to solve the technical problem thereof is: a beverage brewing machine, including a kettle body, where the kettle body includes a container; the container is internally provided with a water feeding device; the water feeding device includes a flow guide cover, a stirrer, and a driving device for driving the stirrer to rotate; the flow guide cover is provided with a water inlet and an outlet; the stirrer is located in the flow guide cover and positioned at the bottom of the container, and a brewing device is disposed above the flow guide cover; the brewing device is provided with a flow guide cavity and an accommodating cavity; the accommodating cavity is communicated with the flow guide cavity, and is provided with a filtering hole; and the driving device is located below the container.

Preferably, the stirrer is provided with a blade, a connecting hole, and a first magnet; a positioning rod is provided at the bottom of the container; the stirrer is positioned on the positioning rod through the matching of the connecting hole and the positioning rod; the driving device includes a motor, a driving wheel, and a second magnet located in the driving wheel; and the driving device drives the stirrer to rotate by means of a magnetic force between the second magnet and the first magnet.

Preferably, the stirrer is provided with a blade and a connecting base; the driving device includes a motor and a driving wheel; and the driving device drives the stirrer to rotate through the matching of the driving wheel and the connecting base.

Preferably, a heat conducting plate is provided on a bottom of the container, and the flow guide cover is connected to the heat conducting plate.

Preferably, the flow guide cover includes a hollow cavity and a bracket; the bracket is movably connected to the cavity and positioned on the heat conducting plate; and the outlet is not in contact with the flow guide cavity.

Preferably, a first convex rib is provided on a side of the bracket and is in snap-fit to the cavity.

Preferably, the heat conducting plate is provided with a positioning ring, and the flow guide cover is located in the positioning ring.

Preferably, the heat conducting plate forms a recess downwards; the recess is provided with a positioning rib, and the flow guide cover is positioned on the recess by means of the positioning rib.

Preferably, the heat conducting plate forms a protrusion upwards; the protrusion is provided with a snap ring; the flow guide cover is provided with a second convex rib, and the flow guide cover is positioned on the protrusion through the matching of the convex rib and the snap ring.

Preferably, a third magnet is provided on the bottom of the flow guide cover for positioning, and the heat conducting plate is provided with a fourth magnet or a magnetic ring that is magnetically attracted to the third magnet.

Preferably, the beverage brewing machine further includes a temperature sensor, a main control circuit board, a control key, and a heating device, where the temperature sensor is closely attached to the heat conducting plate, and the main control circuit board is electrically connected to the temperature sensor, the control key, the driving device, and the heating device, respectively.

Preferably, the heating device includes an electromagnetic heating device; the heat conducting plate is a metal piece; the electromagnetic heating device includes an exciting coil and a bobbin holder, and the exciting coil is wound on the bobbin holder.

Preferably, the kettle body further includes a bottom cover; the heating device includes a heating tube; the heating tube is closely attached to the bottom of the heat conducting plate; and the heating tube and the heat conducting plate are located in the kettle body and above the bottom cover.

Preferably, the beverage brewing machine further includes a base movably matching the kettle body, and the kettle body is provided with a handle. The base is provided with a first lower electrical connector, and a first upper electrical connector is disposed at the handle. The first lower electrical connector is matched with and electrically connected to the first upper electrical connector, and the first upper electrical connector is electrically connected to the heating tube and the temperature sensor.

Preferably, the base is provided with a convex portion, and the driving device is located in the convex portion. A concave cavity matching the convex portion is provided with on the bottom cover.

Preferably, the beverage brewing machine further includes a power base, and the driving device and the main control circuit board are located below the heat conducting plate and above the bottom cover. The bottom cover is internally provided with a second upper electrical connector, and the power base is provided with a second lower electrical connector. The second lower electrical connector is electrically connected to and matched with the second upper electrical connector.

Preferably, a maximum water level line is provided in the container, and the brewing device is located above the maximum water level line.

Preferably, a spray orifice is provided on an upper portion of the flow guide cavity, and a rotatable flow guide component is disposed above the spray orifice.

Preferably, the flow guide component includes a connecting portion and a flow guide portion connected to the connecting portion. The connecting portion is provided with a water guide cavity and a clamping end. The flow guide portion is provided with a flow guide groove, and both sides of the flow guide groove are provided with water guide pieces. The connecting portion is movably clamped on the spray orifice by means of the clamping end, and the water guide cavity is respectively communicated with the flow guide groove and the spray orifice.

Preferably, a middle portion of the flow guide portion is further provided with a flow guide convex surface, and the flow guide convex surface is located over the water guide cavity.

Preferably, a supporting ring is provided on the top of the brewing device, and the container is provided with a kettle lid. The brewing device is positioned in the container by means of the supporting ring and is located below the kettle lid.

Preferably, the brewing device is V-shaped, an upper portion of the brewing device is clamped on a kettle port of the kettle body, and middle and lower portions of the brewing device are located in the container.

Preferably, the brewing device is located above the kettle port of the kettle body and connected to the kettle port of the kettle body.

One of the above-mentioned technical solutions has at least one of the following advantages or advantageous effects: during operation, the stirrer performs a suction effect by stirring water in the flow guide cover, and water is sucked by means of the water inlet of the flow guide cover, sprayed from the outlet to the flow guide cavity of the brewing device and flows into the accommodating cavity, so that the stirrer stirs the water in the flow guide cover, and partial stirring is formed in the container, which effectively reduces a stirring space and reduces a stirring load. The power of the driving device can be reduced, the noise is lowered, and the cost is reduced. Moreover, water is intensively sprayed out of the outlet and flows into the accommodating cavity by means of the flow guide cavity of the brewing device for brewing to-be-brewed beverages placed in the accommodating cavity, such as tea, coffee and chocolate, and water flows back to the container by means of the filtering hole to produce a strong visual effect. The beverage brewing machine can uniformly brew a beverage without blocking a pipeline and is convenient to clean.

BRIEF DESCRIPTION OF THE DRAWINGS

The present disclosure will be further described below in conjunction with the accompanying drawings.

DETAILED DESCRIPTION

Specific embodiments of the present disclosure will be described below in detail. Preferred embodiments of the present disclosure are illustrated in the accompanying drawings. The accompanying drawings play the role of graphically supplementing the description of the text of the specification, so that a person can understand the technical features and the overall technical solution of the present disclosure visually and vividly, but the accompanying drawings cannot be construed as limiting the protection scope of the present disclosure.

In the present disclosure, if there is a description of directions ("up", "down", "left", "right", "front" and "back"), it is only for the convenience of describing the technical solution of the present disclosure, and does not indicate or imply that the technical features referred to must have specific orientation and constructed and operated in a specific orientation, which, therefore, cannot be construed as limiting the present disclosure.

In the present disclosure, "several" means one or more, and "a plurality of" means two or more. "Greater than", "less than", "exceed", and the like are understood as not including the number. "Above", "below", "within", and the like are understood as including the number. In the description of the present disclosure, if "first", "second", "third", "fourth" are described, these wordings are only used for distinguishing technical features, and cannot be understood as indicating or implying relative importance or implicitly indicating the number of technical features indicated or implicitly indicating the order of the technical features indicated.

In the description of the present application, unless otherwise explicitly defined, the terms such as "arrange", "install", and "connected to" should be comprehended in a broad sense. For example, these terms may be comprehended as being fixedly connected or indirectly connected by means of an intermediate medium; fixedly connected, or detachably connected or integrally connected; mechanically connected or electrically connected or in communication with each other; or in an internal communication between two elements or interaction between two elements. A person skilled in the art can reasonably determine the specific meaning of the above-mentioned terms in the present disclosure in combination with the specific content of the technical solution.

Figure 1:
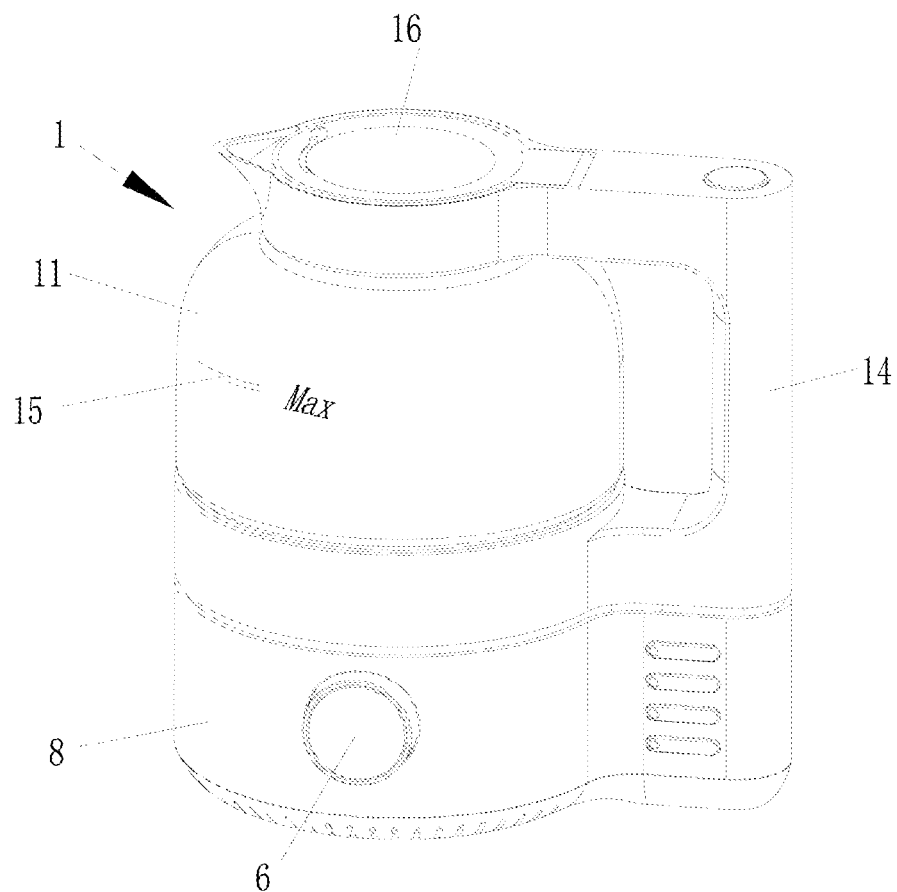
FIG. 1 is a stereoscopic schematic view of a preferred embodiment of the present disclosure.
Figure 2:
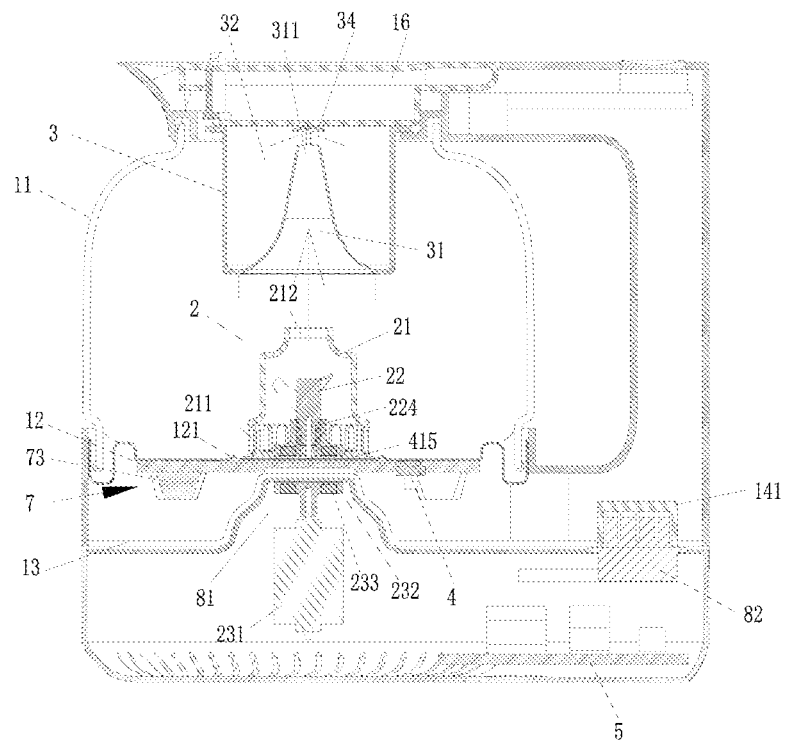
FIG. 2 is a cross-sectional view of the embodiment shown in FIG. 1.
Figure 6:
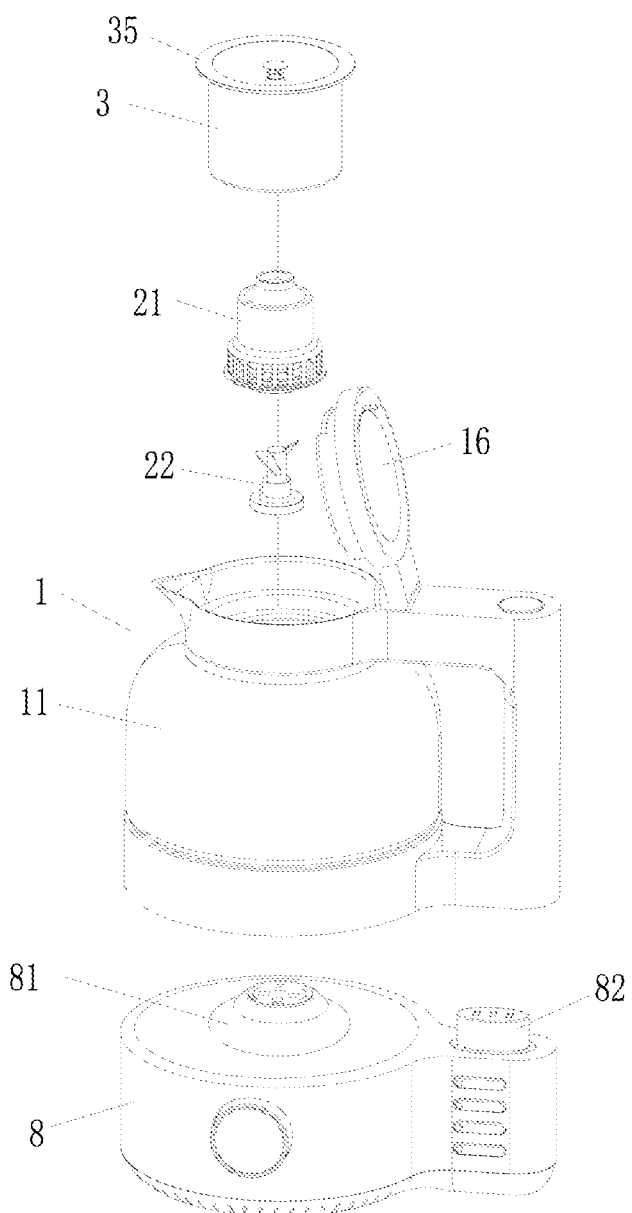
FIG. 6 is a schematic exploded view of the embodiment shown in FIG. 1.

An embodiment of the present disclosure provides a beverage brewing machine. Referring to FIGS. 1, 2, and 6, the beverage brewing machine includes a kettle body 1. The kettle body 1 includes a container 11. The kettle body 1 is provided with a kettle port and a handle 14, and the container 11 is internally provided with a water feeding device 2. The water feeding device 2 includes a flow guide cover 21, a stirrer 22, and a driving device 23 for driving the stirrer 22 to rotate. The flow guide cover 21 is provided with a water inlet 211 and an outlet 212. The stirrer 22 is located in the flow guide cover 21 and positioned at the bottom of the container 11. A brewing device 3 is disposed above the flow guide cover 21. The brewing device 3 is provided with a flow guide cavity 31 and an accommodating cavity 32. The accommodating cavity 32 is communicated with the flow guide cavity 31, and is provided with a filtering hole 33. The driving device 23 is located below the container 11.

Figure 3:
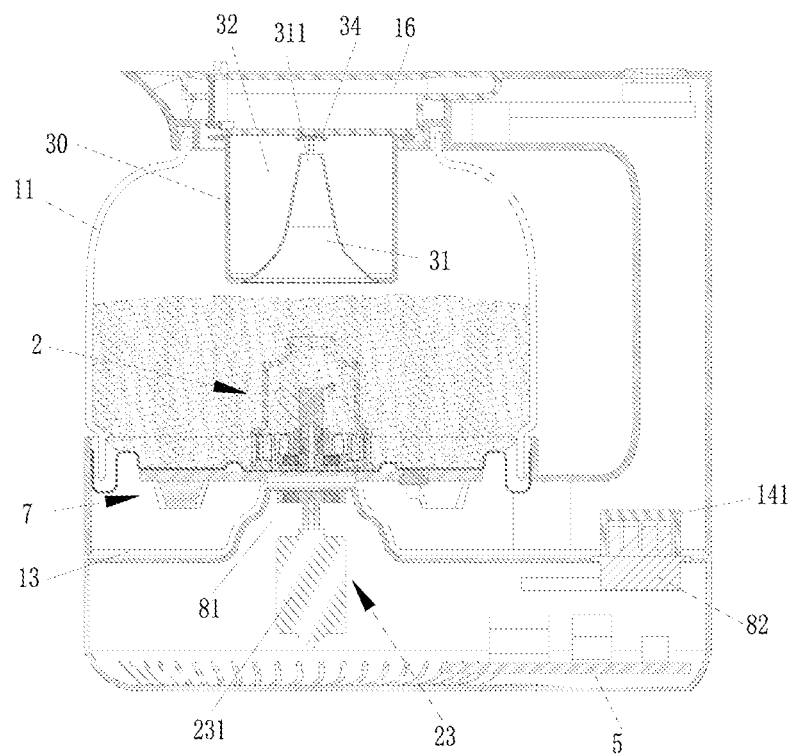
FIG. 3 is a schematic structural view showing a container in an initial state after adding water in the embodiment shown in FIG. 1.
Figure 4:
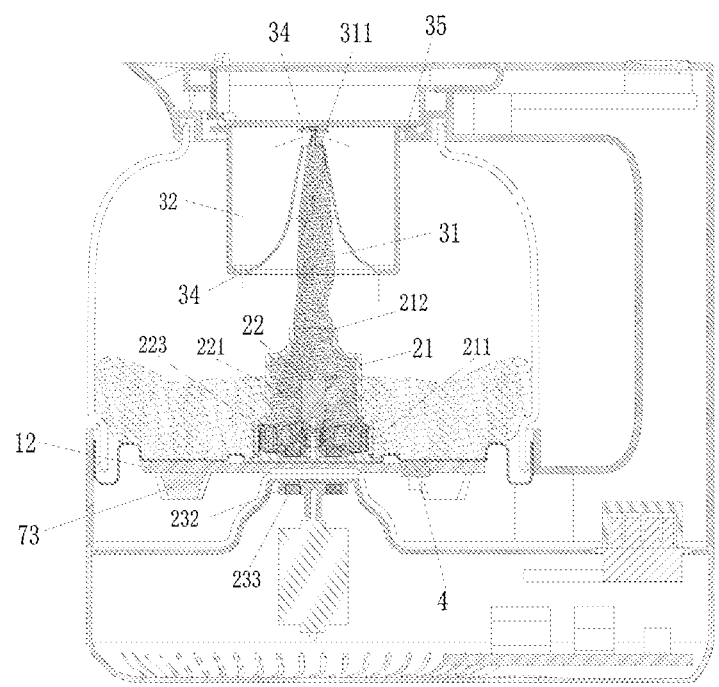
FIG. 4 is a schematic structural view showing a container in an operating state after adding water in the embodiment shown in FIG. 1.

During operation, referring to FIGS. 3 and 4, the stirrer 22 performs a suction effect by stirring water in the flow guide cover 21, and water is sucked by means of the water inlet 211 of the flow guide cover 21, sprayed from the outlet 212 to the flow guide cavity 31 of the brewing device 3 and flows into the accommodating cavity 32, so that the stirrer 22 stirs the water in the flow guide cover 21, and partial stirring is formed in the container 11, which effectively reduces a stirring space and reduces a stirring load. The power of the driving device 23 can be reduced, the noise is lowered, and the cost is reduced. Moreover, water is intensively sprayed out of the outlet 212 and flows into the accommodating cavity 32 by means of the flow guide cavity 31 of the brewing device 3 for brewing to-be-brewed beverages placed in the accommodating cavity 32, such as tea, coffee and chocolate, and water flows back to the container 11 by means of the filtering hole 33 to produce a strong visual effect. The beverage brewing machine can uniformly brew a beverage without blocking a pipeline and is convenient to clean.

In some embodiments, referring to FIGS. 2, 3, 4, 7, 8, 9, 11, 12, 13, and 17, the stirrer 22 is provided with a blade 221, a connecting hole 222, and a first magnet 223. A positioning rod 224 is provided on the bottom of the container 11. The stirrer 22 is positioned on the positioning rod 224 through the matching of the connecting hole 222 and the positioning rod 224. The driving device 23 includes a motor 231, a driving wheel 232, and a second magnet 233 located in the driving wheel 232. The driving device 23 drives the stirrer 22 to rotate by means of a magnetic force between the second magnet 233 and the first magnet 223. Due to a magnetic drive mode, the bottom of the container 11 does not need to be opened, which solves the sealing problem of the container 11.

Figure 5:
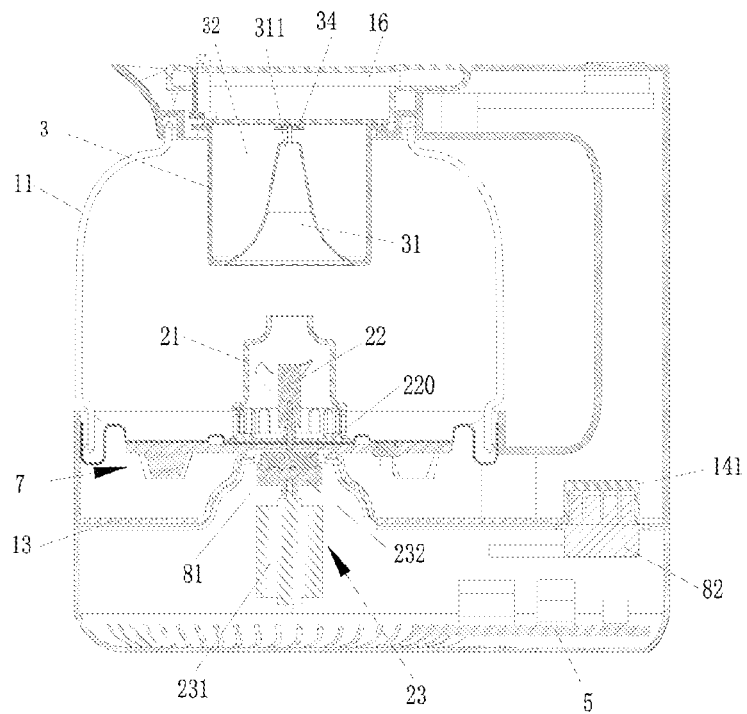
FIG. 5 is a schematic structural view of another embodiment (1) of the present disclosure.
Figure 14:
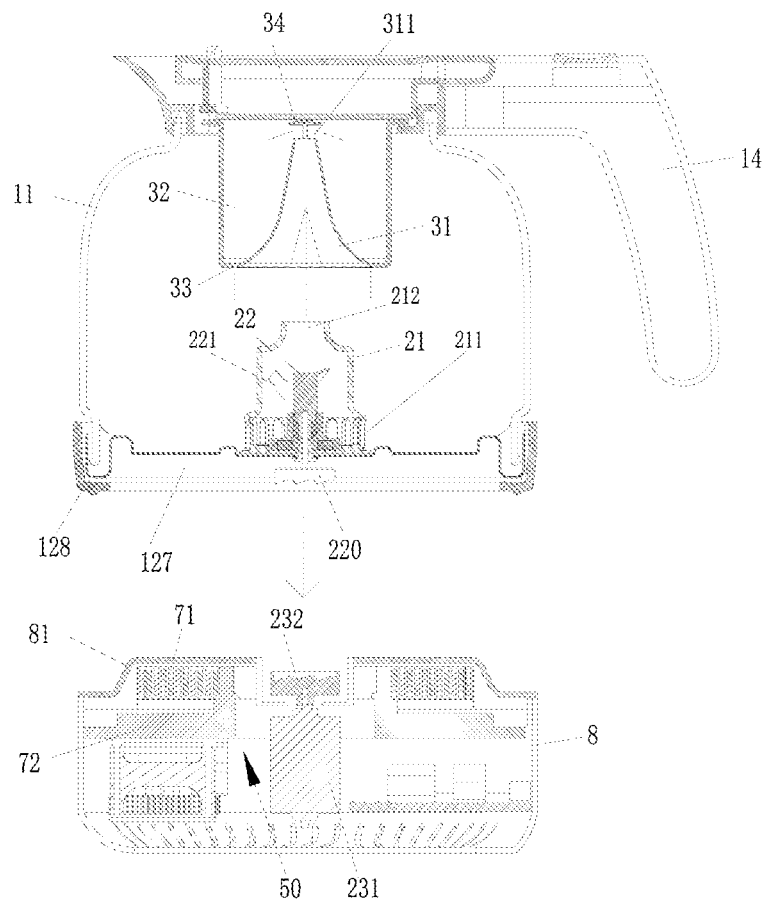
FIG. 14 is a schematic structural view of another embodiment (8) of the present disclosure.

In some embodiments, referring to FIGS. 5 and 14, the stirrer 22 is provided with a blade 221 and a connecting base 220. The blade 221 is positioned in an arc shape on the connecting base 220 and located above the water inlet 211. The driving device 23 includes a motor 231 and a driving wheel 232. The driving device 232 is mechanically matched with the connecting base 220, and the driving device 23 drives the stirrer 22 to rotate through the matching of the driving wheel 232 and the connecting base 220. A sealing element is disposed between the connecting base 220 and the container 11 for sealing.

Figure 15:
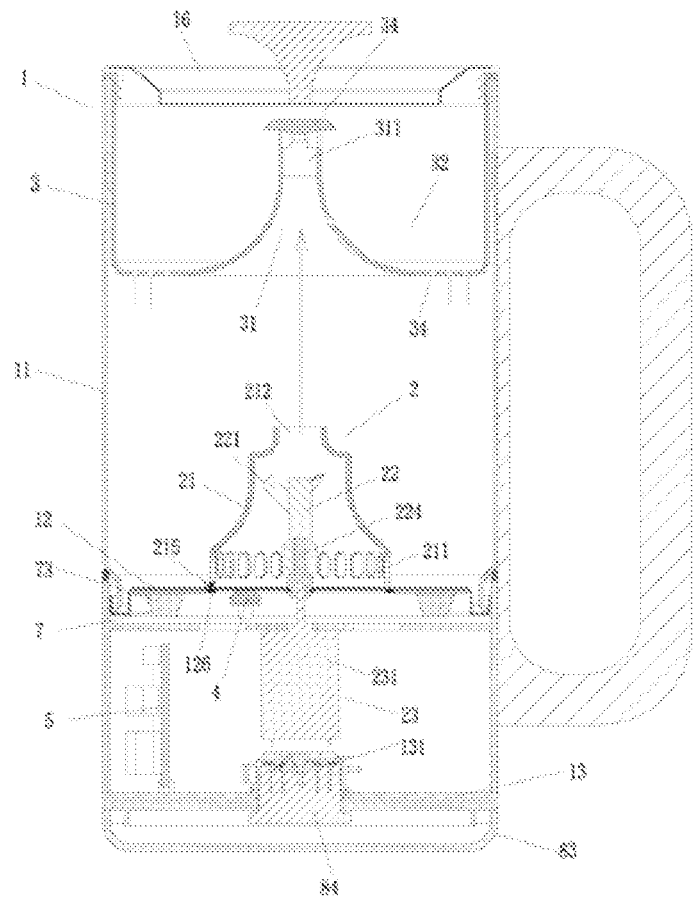
FIG. 15 is a schematic structural view of another embodiment (9) of the present disclosure.
Figure 16:
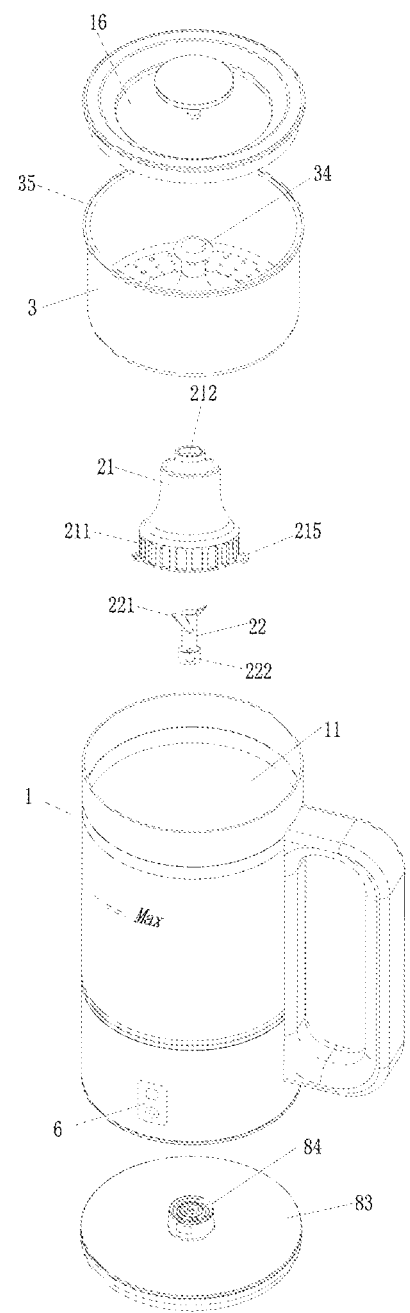
FIG. 16 is a schematic exploded view of the embodiment of the present disclosure shown in FIG. 15.
Figure 17:
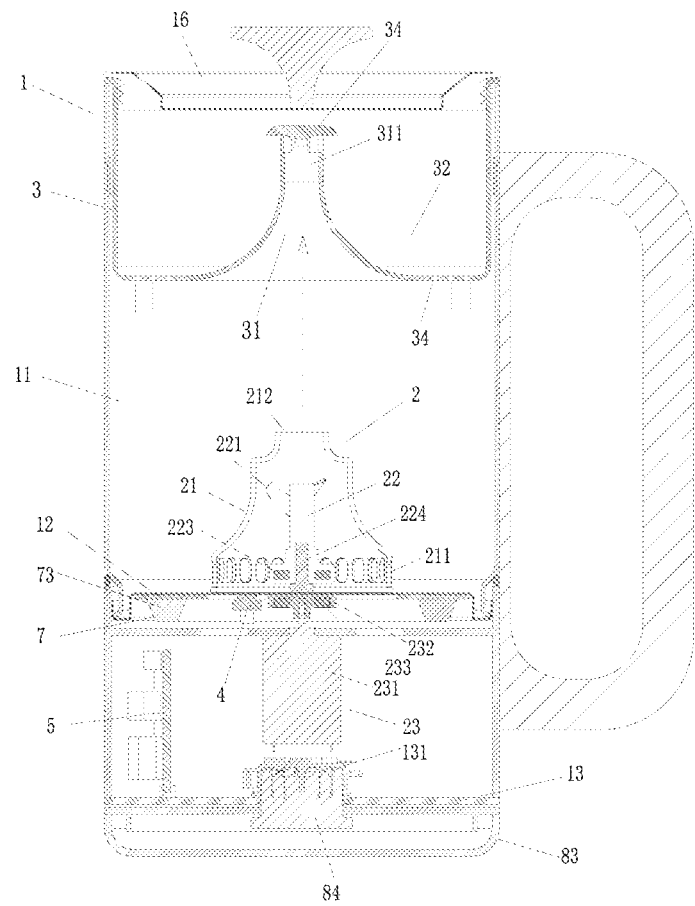
FIG. 17 is a schematic structural view of another embodiment (10) of the present disclosure.
Figure 18:
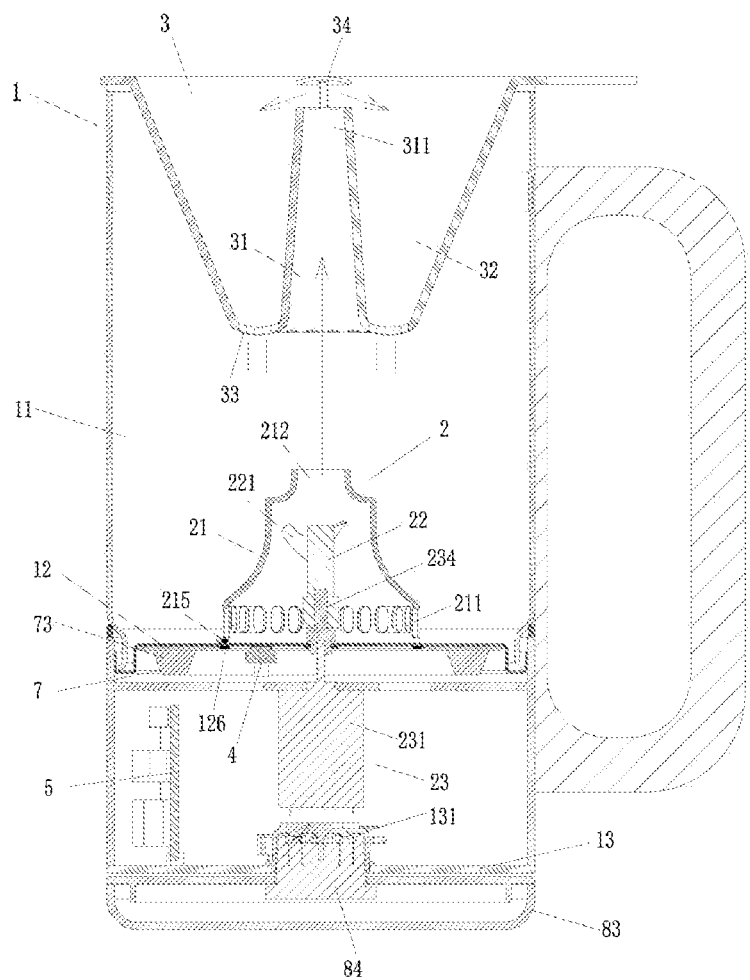
FIG. 18 is a schematic structural view of another embodiment (11) of the present disclosure.

In some embodiments, referring to FIGS. 15, 16, and 18, the stirrer 22 includes a blade 221 and a connecting hole 222. The blade 221 is in an arc shape and located above the water inlet 211. A connecting shaft 234 of the driving device 23 passes through a heat conducting plate and is movably and matingly inserted in the connecting hole. A seal ring is disposed between the connecting shaft and the heat conducting plate. When the driving device rotates, the connecting shaft drives the blade of the stirrer to rotate to generate a suction effect, and water in the brewing cavity flows from the water inlet and is sprayed out of the outlet.

A heat conducting plate 12 is provided on the bottom of the container 11, and the flow guide cover 21 is connected to the heat conducting plate 12.

Figure 10:
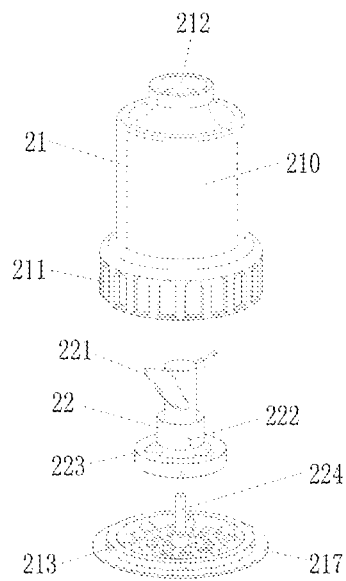
FIG. 10 is a schematic exploded view showing the structure of a flow guide cover and a stirrer in the embodiment shown in FIG. 6.

In some embodiments, referring to FIG. 10, the flow guide cover 21 includes a hollow cavity 210 and a bracket 217. The bracket 217 is provided with a positioning rod 224. A lower portion of the stirrer 22 is provided with a connecting hole 222 movably matching the positioning rod 224. The stirrer 22 is matingly positioned on the positioning rod 224 by means of the connecting hole 222. The bracket 217 is movably connected to the cavity 210 and positioned on the heat conducting plate 12.

Referring to FIG. 10, a side of the bracket 217 is provided with a first convex rib 213 that is in snap-fit to the cavity 210. Through the movable clamping action of the bracket 217 and the flow guide cover 21, the stirrer 22 can be movably positioned in the cavity 210 of the flow guide cover 21, which facilitates the installation and positioning of the stirrer 22 and the flow guide cover 21, and also facilitates the dismantling and cleaning of the stirrer 22 and the flow guide cover 21.

Figure 19:
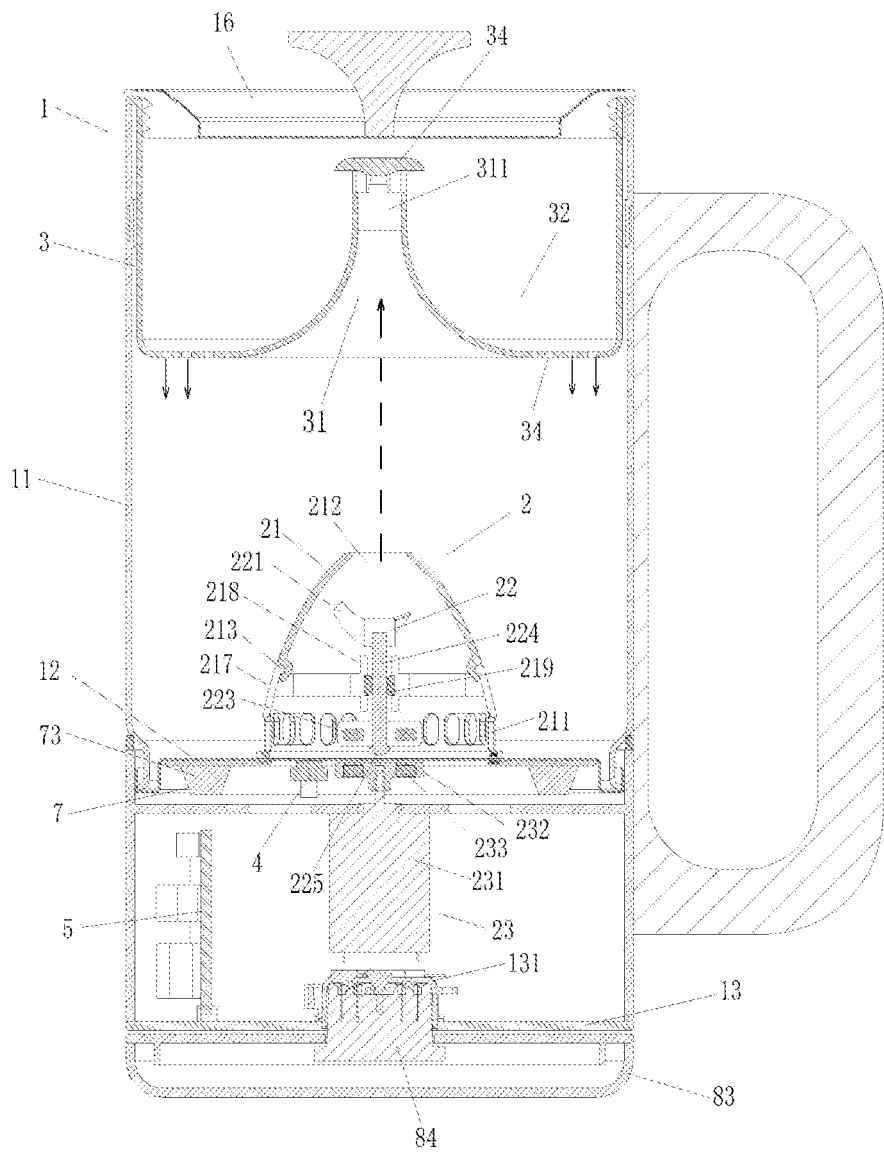
FIG. 19 is a schematic structural view of another embodiment (12) of the present disclosure.

In some embodiments, referring to FIG. 19, a first convex rib 213 in snap-fit to the cavity 210 is provided at a side of the bracket 217. By the upper and lower movable clamping action of the bracket 217 and the flow guide cover 21, the stirrer 22 can be movably positioned in the cavity 210 of the flow guide cover 21, the inside of the bracket 217 extends radially to form a connecting ring 218. Specifically, the connecting ring 218 is integrally formed by three or four sheet structures extending from the radial direction to the center, the lower portion of the stirrer 22 is movably sleeved in the connecting ring 218 through the positioning rod 224, a boss 225 is further provided at the bottom of the stirrer 22 for movably supporting the stirrer 22, thus reducing friction between the agitator 22 and the bottom of the container. Due to the movably sleeving between the connecting ring 218 and the positioning rod 224, the axial positioning of the stirrer 22 is very precise, and the rotation of the stirrer 22 is stable. Furthermore, a silicone ring 219 is installed in the connecting ring 218 for reducing friction and noise generated by the agitator 22 during rotation.

Referring to FIGS. 2 to 5, the heat conducting plate 12 is provided with a positioning ring 121, and the flow guide cover 21 is located in the positioning ring 121, to facilitate the radial positioning of the flow guide cover 21.

Figure 11:
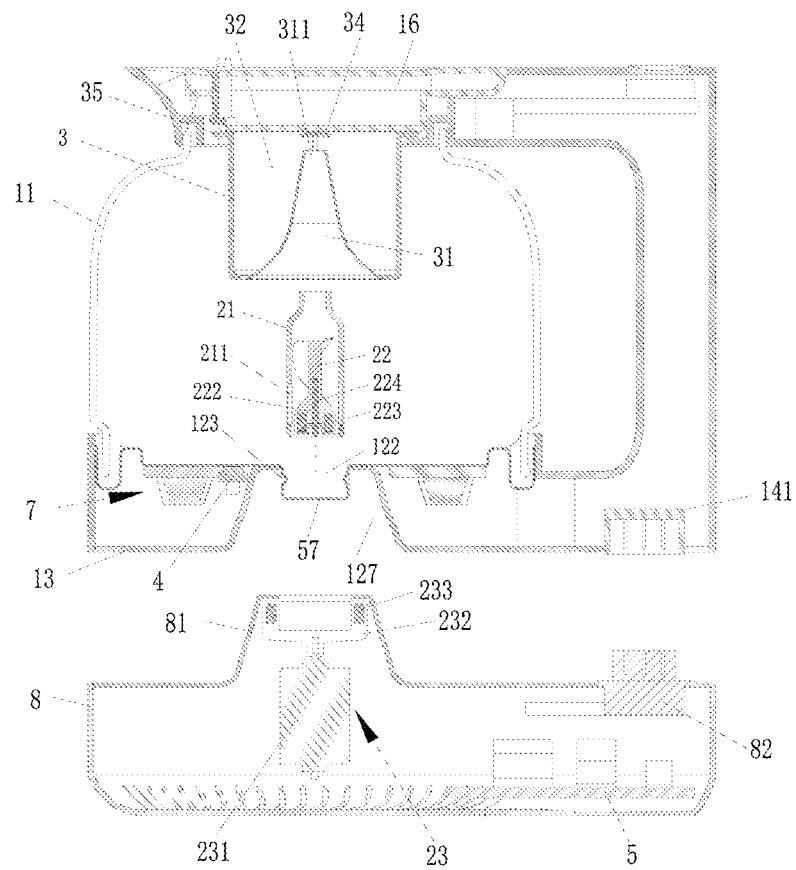
FIG. 11 is a schematic structural view of another embodiment (5) of the present disclosure.

In some embodiments, referring to FIG. 11, the heat conducting plate 12 is bent downwards to form a recess 122.

The recess 122 is provided with a positioning rib 123. The flow guide cover 21 is in snap-fit to the positioning rib 123 by means of a water inlet on the lower portion. The flow guide cover 21 is positioned on the recess 122 by means of the positioning rib 123. A vertical height of the water inlet is still higher than that of the recess 122, to ensure that the water inlet is communicated with the container 11.

Figure 12:
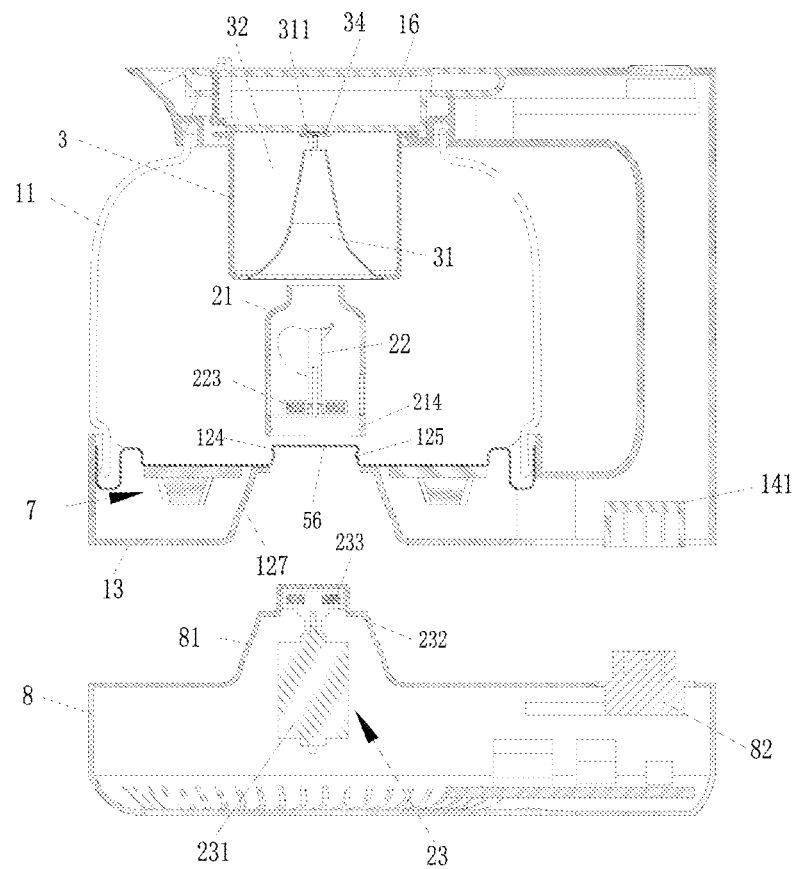
FIG. 12 is a schematic structural view of another embodiment (6) of the present disclosure.

In some embodiments, referring to FIG. 12, the heat conducting plate 12 forms a protrusion 124 upwards. The protrusion 124 is provided with a snap ring 125. The snap ring 125 is located on a side wall of the protrusion 124. The flow guide cover 21 is provided with a second convex rib 214. The flow guide cover 21 is positioned on the protrusion 124 through the matching of the second convex rib 214 and the snap ring 125. In this way, it is convenient to install, position, dismantle and clean the flow guide cover 21, and the first magnet 223 of the stirrer 22 and the second magnet 233 of the driving device 23 are far away from a heating tube, so as to avoid being affected by high temperature of the heating tube, thereby prolonging the service life of the magnet.

In some embodiments, referring to FIGS. 15 and 18, the bottom of the flow guide cover 21 is provided with a third magnet 215 for positioning, and the heat conducting plate 12 is provided with a fourth magnet 126 or a magnetic ring that is magnetically attracted to the third magnet 215. The fourth magnet 126 is disposed at the bottom of the heat conducting plate 12. Certainly, a corresponding magnetic ring such as an iron ring can also be disposed at the bottom of the heat conducting plate 12, then when the flow guide cover 21 is placed, the flow guide cover 21 can be positioned at the bottom of the container through the magnetic attraction between the third magnet 215 and the fourth magnet 126 or the iron ring.

The beverage brewing machine further includes a temperature sensor 4, a main control circuit board 5, a control key 6, and a heating device 7. The temperature sensor 4 is closely attached to the heat conducting plate 12. The main control circuit board 5 is electrically connected to the temperature sensor 4, the control key 6, the driving device 23, and the heating device 7, respectively. The temperature sensor 4 is used to detect the temperature of the bottom of the kettle body 1 and feed back a temperature sensing signal to the main control circuit board 5.

The basic principle of the beverage brewing machine of the present disclosure is as follows: the control key 6 is pressed down, the control key 6 includes a start button, a temperature selection button, a brewing time button, and the like; the main control circuit board 5 controls the heating device 7 for heating, and when the temperature sensor 4 detects that a temperature set by a consumer is reached, the main control circuit board 5 controls the heating device 7 to stop heating, and the main control circuit board 5 controls the driving device 23 to rotate; the rotation of the driving device 23 drives the stirrer 22 to rotate in the flow guide cover 21; the blade 221 on the upper portion of the stirrer 22 performs vortex-stirring, and the blade 221 is in an arc shape; water outside the flow guide cover 21 is continuously sucked into the flow guide cover 21 by means of the water inlet 211 at the bottom of the flow guide cover; due to the suction effect generated by the stirring of the blade 221, water in the flow guide cover 21 moves upwards along an inner wall of the flow guide cover 21 and is sprayed out by means of the outlet 212 on the upper portion of the flow guide cover 21, the sprayed water is introduced into the accommodating cavity 32 along the flow guide cavity 31 of the brewing device 3 to brew tea, coffee, chocolate, or the like placed in the accommodating cavity 32, and then water flows into the container 11 from the filtering hole 33, to complete automatic brewing in set brewing time. Before the beverage brewing machine of the present disclosure brews a beverage, the tea, coffee, chocolate, or the like is isolated from water.

Figure 13:
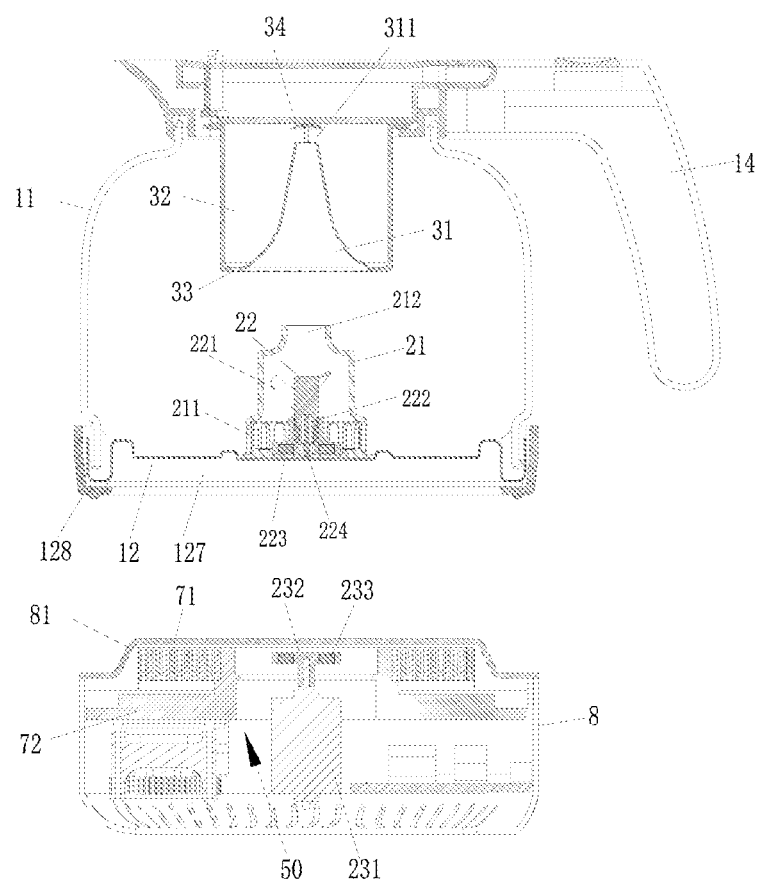
FIG. 13 is a schematic structural view of another embodiment (7) of the present disclosure.

In some embodiments, referring to FIGS. 13 and 14, the heating device 7 includes an electromagnetic heating device. The heat conducting plate 12 is a metal piece. The electromagnetic heating device includes an exciting coil 71 and a bobbin holder 72. The exciting coil 71 is wound on the bobbin holder 72. The electromagnetic heating device can heat the heat conducting plate 12. By installing the electromagnetic heating device and the driving device 23 in the base, the size and weight of the kettle body 1 can be effectively reduced, and the electrical connection between the kettle body 1 and the base is avoided, which facilitates operation and cleaning.

The heat conducting plate 12 is provided with a concave cavity 127. The heat conducting plate 12 is preferably made of stainless steel. The base 8 is provided with a convex portion 81 movably matching the concave cavity 127. The electromagnetic heating device and the driving device 23 are located in the convex portion 81. The driving device 23 is located at the central axis of the convex portion 81. The electromagnetic heating device is located around the driving device 23. The kettle body 1 and the base 8 can rotate around the central axis of the convex portion 81 through the movable matching action of the concave cavity 127 and the convex portion 81. Since the heat conducting plate 12 is provided with the concave cavity 127, the area of the heat conducting plate 12 subjected to electromagnetic heating is recessed to be away from the kettle bottom, thereby achieving a heat insulation effect in the taking and placing process. An annular frame 128 is mounted on the lower portion of the heat conducting plate 12, and the annular frame 128 is located outside the concave cavity 127. The annular frame 128 is specifically made of a plastic heat-resistant material for the supporting of the kettle body 1 and heat insulation and anti-scald.

In some embodiments, referring to FIGS. 2, 3, 4, 5, 7, 8, 9, 11, 12, 15, 17, 18, and 19, the kettle body 1 further includes the bottom cover 13, and the heating device 7 includes a heating tube 73. The heating tube 73 is closely attached to the bottom of the heat conducting plate 12, and the heating tube 73 and the heat conducting plate 12 are located in the kettle body 1 and above the bottom cover 13. The heating tube 73 can heat the heat conducting plate 12.

In some embodiments, referring to FIGS. 2, 3, 4, 5, 7, 8, 9, 11, 12, 15, 17 and 18, the kettle body 1 further includes the bottom cover 13, and the heating device 7 includes a heating tube 73. The heating tube 73 is closely attached to the bottom of the heat conducting plate 12, and the heating tube 73 and the heat conducting plate 12 are located in the kettle body 1 and above the bottom cover 13. The heating tube 73 can heat the heat conducting plate 12.

The base 8 is provided with a convex portion 81, the driving device 23 is located in the convex portion 81, and the bottom cover 13 is provided with a concave cavity 127 matching the convex portion 81, thereby reducing the overall height and weight of the kettle body 1 in the design, and facilitating use by consumers.

In some embodiments, referring to FIGS. 15, 16, 17 and 18, the beverage brewing machine further includes a power base 83. The driving device 23 and the main control circuit board 5 are located below the heat conducting plate 12 and above the bottom cover 13. The bottom cover 13 is internally provided with a second upper electrical connector 131, and the power base 83 is provided with a second lower electrical connector 84. The second lower electrical connector 84 is electrically connected to and matched with the second upper electrical connector 131. Through the electrical connection and matching of the second lower electrical connector 84 of the power base 83 and the second upper electrical connector 131, power can be supplied to the driving device 23 and the heating tube 73 in the kettle body 1. Moreover, the kettle body 1 can rotate on the power base 83, the placement is convenient, and the cost is low. Moreover, the main control circuit board 5 is disposed in the kettle body 1 to better lay out the power supply mode of the control key 6 and the temperature sensor 4. The second upper electrical connector 131 and the second lower electrical connector 84 only need to adopt a three-ring connection, namely live line, null line and ground line connection, and the cost is low.

In some embodiments, referring to FIG. 1, a maximum water level line 15 is provided in the container 11, and the brewing device 3 is located above the maximum water level line 15. Water added to the container 11 cannot exceed the maximum water level line 15, so that to-be-brewed tea, coffee, chocolate, and the like in the brewing device 3 are not in contact with water first.

In some embodiments, referring to FIGS. 2, 3, 4, 5, 7, 8, 9, 11, 12, 13, 14, 15, 16, 17, and 18, an upper portion of the flow guide cavity 31 is provided with a spray orifice 311, a flow guide component 34 is disposed above the spray orifice 311. The stirrer 22 is driven by the driving device 23 to stir water in the flow guide cover 21 to generate a suction effect, water is sucked by means of the water inlet 211 of the flow guide cover 21, water sprayed out of the outlet 212 is introduced into a rotating element along a water outlet of the flow guide cavity 31 of the brewing device 3, and then water is dispersed and sprayed out of the flow guide portion to enter the accommodating cavity 32, and then water flows into the container 11 from the filtering hole 33 at the bottom of the accommodating cavity 32. In this way, the beverages such as tea, coffee and chocolate which are placed in the accommodating cavity 32 are brewed in a circular manner, and the flow guide component 34 can spray and disperse water when water enters the accommodating cavity 32, so that the brewing area is increased, the brewing is more uniform, and the brewing effect is good.

Figure 20:
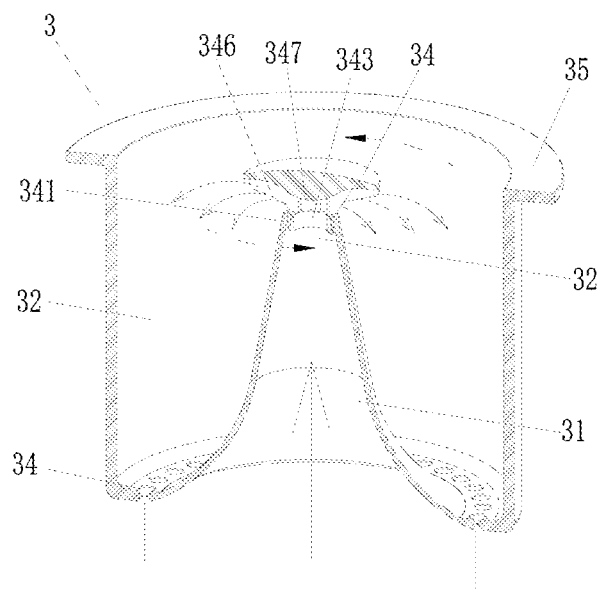
FIG. 20 is a schematic structural view of a flow guide component in the embodiment shown in FIG. 2.

Referring to FIGS. 20 and 22, the flow guide component 34 includes a connecting portion 341 and a flow guide portion 342, and the connecting portion 341 is connected to the flow guide portion 342. The connecting portion 341 is provided with a water guide cavity 343 and a clamping end 344. The flow guide portion 342 is provided with at least three arc-shaped flow guide grooves 345, and both sides of the flow guide groove 345 are provided with water guide pieces 346. The water guide pieces 346 are arranged to increase the rotational power when water is sprayed up, so that water is more dispersedly sprayed. The connecting portion 341 is movably clamped on the spray orifice 311 by means of the clamping end 344, and the water guide cavity 343 is respectively communicated with the flow guide groove 345 and the spray orifice 311.

Figure 21:
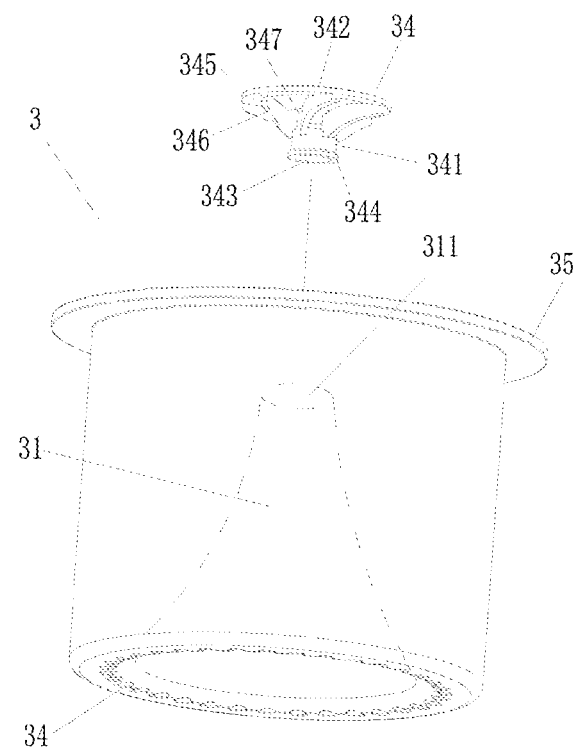
FIG. 21 is a schematic exploded view of the flow guide component in the embodiment shown in FIG. 2.

Referring to FIGS. 20 and 21, a middle portion of the flow guide portion 342 is further provided with a flow guide convex surface 347, and the flow guide convex surface 347 is located over the water guide cavity 343. There is a certain gap between an upper opening of the water guide cavity 343 and the flow guide convex surface 347, so that after water is sprayed out of the upper opening of the water guide cavity 343, water generates vortexes for buffering and is radially guided along the flow guide convex surface 347, and the rotation effect is more gentle.

In some embodiments, referring to FIGS. 1, 2, 3, 4, 5, 6, 11, 12, 13, 14, 15, 16 and 17, the top of the brewing device 3 is provided with a supporting ring 35, and the container 11 is provided with a kettle lid 16. The brewing device 3 is positioned in the container 11 by means of the supporting ring 35 and located below the kettle lid 16.

Figure 7:
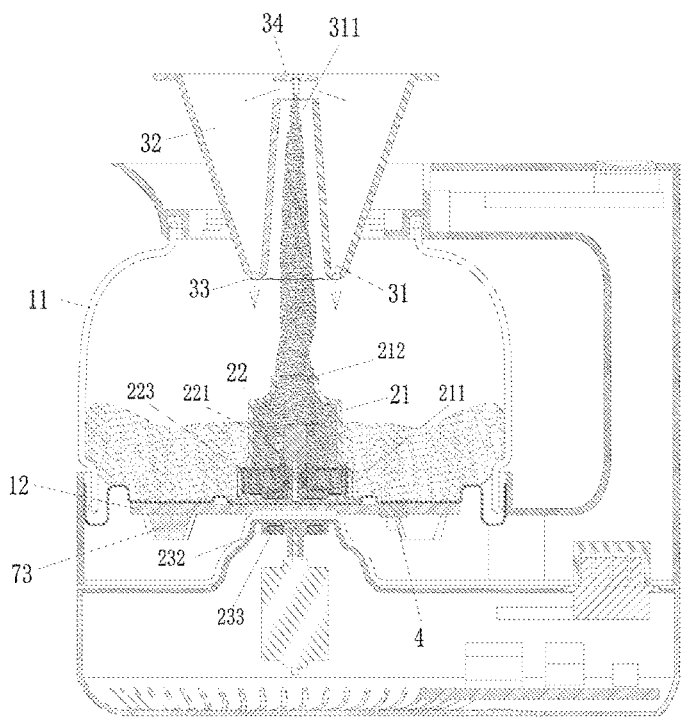
FIG. 7 is a schematic structural view of another embodiment (2) of the present disclosure.

In some embodiments, referring to FIGS. 7 and 18, the brewing device 3 is V-shaped. An upper portion of the brewing device 3 is clamped on a kettle port of the kettle body, and middle and lower portions of the brewing device 3 are located in the container 11. The brewing device 3 is V-shaped, and ground coffee is directly added to the accommodating cavity 32, so that an automatic coffee machine can be simulated to brew coffee, and certainly, other beverages such as tea and chocolate can also be brewed.

Figure 8:
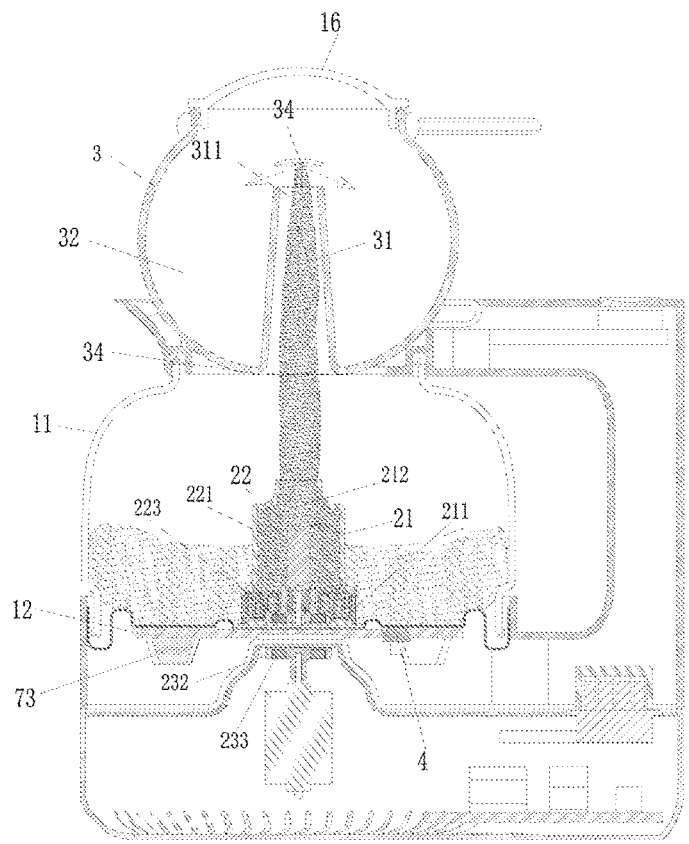
FIG. 8 is a schematic structural view of another embodiment (3) of the present disclosure.

In some embodiments, referring to FIG. 8, the brewing device 3 is located above the kettle port of the kettle body and connected to the kettle port of the kettle body. The brewing device 3 is provided with a kettle lid 16, and a to-be-brewed beverage is placed by opening the kettle lid 16. It is convenient for a consumer to take, use, or clean the brewing device 3, and the brewing device 3 also facilitates visual observation.

Figure 9:
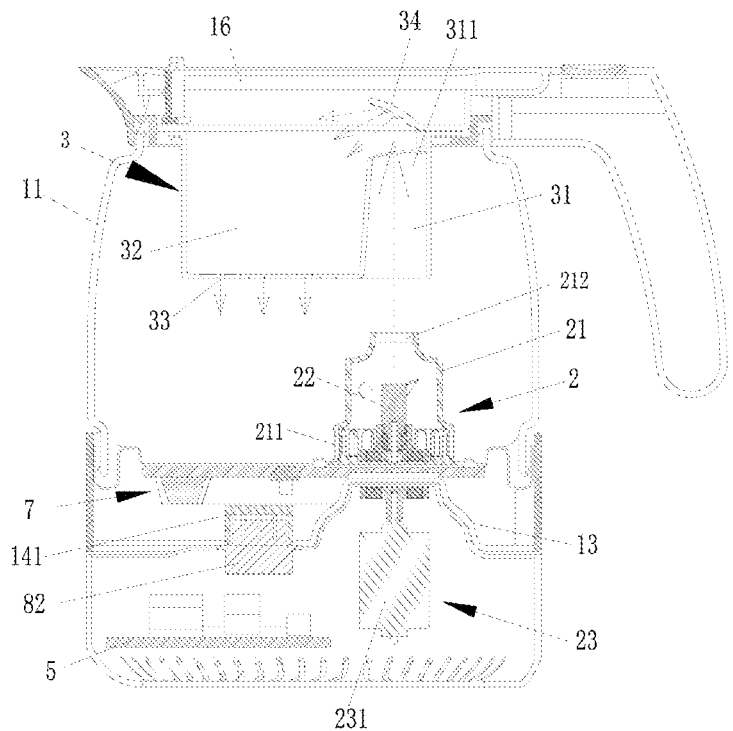
FIG. 9 is a schematic structural view of another embodiment (4) of the present disclosure.

In some embodiments, referring to FIG. 9, the water feeding device 2 is eccentrically disposed with respect to the center of the container 11; that is, the flow guide cover 21, the stirrer 22, and the driving device 23 are arranged at the side of the center of the container 11, and the flow guide cavity 31 of the brewing device 3 is also eccentrically disposed, so that the outlet 212 of the flow guide cover 21 is aligned with the flow guide cavity 31. After being sprayed out of the outlet 212, water is introduced into the accommodating cavity 32 along the flow guide cavity 31 and the flow guide piece above the spray orifice 311. Since the water feeding device 2 is eccentrically disposed, spaces at the lower portions of the base 8 and the kettle body 1 can be further optimized, so that the upper electrical connectors and the lower electrical connectors can be arranged at the center.

In some embodiments, referring to FIGS. 1, 2, and 3, the flow guide cavity 31 is located above the outlet 212 and is not in contact with the outlet 212. During use, the visual effect is good and the installation is easy.

Compared with the prior art, the embodiments of the present disclosure have the following beneficial effects: uniform brewing, good brewing effect, simple power supply mode, low cost, and simple and convenient kettle body placement.

Certainly, the present disclosure is not limited to the embodiments described above, and those skilled in the art can further make equivalent variations or substitutions without departing from the spirit of the present disclosure. These equivalent variations or substitutions all fall within the scope defined by the claims of the present application.

The invention claimed is:
1. A beverage brewing machine, comprising:
a kettle body including a container;
a water feeding device arranged within the container, comprising a flow guide cover provided with a water inlet and an outlet, a stirrer located in the flow guide cover and positioned on a bottom of the container, and a driving device for driving the stirrer to rotate, wherein the driving device is located below the container; and
a brewing device disposed above the flow guide cover and provided with a flow guide cavity and an accommo- dating cavity, wherein the accommodating cavity is communicated with the flow guide cavity, and is provided with a filtering hole;

wherein a heat conducting plate is provided on the bottom of the container and is connected to the flow guide cover, the flow guide cover comprises a hollow cavity and a bracket movably connected to the cavity and positioned on the heat conducting plate, the flow guide cavity is located above the outlet and is not in contact with the outlet, the stirrer is configured to perform a suction effect by stirring water in the flow guide cover, and water is sucked in through the water inlet of the flow guide cover, sprayed from the outlet to the flow guide cavity and flows into the accommodating cavity.

2. The beverage brewing machine according to claim 1, wherein the stirrer is provided with a blade, a connecting hole, and a first magnet; a positioning rod is provided at the bottom of the container; the stirrer is positioned on the positioning rod through the matching of the connecting hole and the positioning rod; the driving device comprises a motor, a driving wheel, and a second magnet located in the driving wheel; and the driving device drives the stirrer to rotate by means of a magnetic force between the second magnet and the first magnet.

3. The beverage brewing machine according to claim 1, wherein the stirrer is provided with a blade and a connecting base; the driving device comprises a motor and a driving wheel; and the driving device drives the stirrer to rotate through the matching of the driving wheel and the connecting base.

4. The beverage brewing machine according to claim 1, wherein a first convex rib is provided on a side of the bracket and is in snap-fit to the cavity.

5. The beverage brewing machine according to claim 1, wherein the heat conducting plate is provided with a positioning ring, within which the flow guide cover is located.

6. The beverage brewing machine according to claim 1, wherein the heat conducting plate forms a recess downwards; the recess is provided with a positioning rib, and the flow guide cover is positioned on the recess by means of the positioning rib.

7. The beverage brewing machine according to claim 1, further comprising a temperature sensor, a main control circuit board, a control key, and a heating device, wherein the temperature sensor is closely attached to the heat conducting plate, and the main control circuit board is electrically connected to the temperature sensor, the control key, the driving device, and the heating device, respectively.

8. The beverage brewing machine according to claim 7, wherein the heating device comprises an electromagnetic heating device; the heat conducting plate is a metal piece; the electromagnetic heating device comprises an exciting coil and a bobbin holder; and the exciting coil is wound on the bobbin holder.

9. The beverage brewing machine according to claim 7, wherein the kettle body further comprises a bottom cover; the heating device comprises a heating tube; the heating tube is closely attached to the bottom of the heat conducting plate; and the heating tube and the heat conducting plate are located in the kettle body and above the bottom cover.

10. The beverage brewing machine according to claim 1, wherein a maximum water level line is provided in the container, and the brewing device is located above the maximum water level line.

11. The beverage brewing machine according to claim 1, wherein a spray orifice is provided on an upper portion of the flow guide cavity, above which a rotatable flow guide component is disposed; the flow guide component comprises a connecting portion and a flow guide portion connected to the connecting portion.

\* \* \* \* \*